United States Patent
Wagstoff

[15] 3,635,127
[45] Jan. 18, 1972

[54] HYDRAULIC CYLINDER MOUNT FOR A FORAGE HARVESTER

[72] Inventor: Robert A. Wagstoff, 350 E. Conestoga Street, New Holland, Pa. 17557

[22] Filed: Jan. 2, 1970

[21] Appl. No.: 5,397

Related U.S. Application Data

[62] Division of Ser. No. 762,930, Aug. 26, 1968, Pat. No. 3,516,713.

[52] U.S. Cl. ................................................92/161
[51] Int. Cl. ..........................F01b 29/08, F16m 13/02
[58] Field of Search ............92/118, 119, 161; 248/289, 248/291; 73/248; 91/210–215; 123/42; 103/159; 230/175

[56] References Cited

UNITED STATES PATENTS

| | | | |
|---|---|---|---|
| 557,294 | 3/1896 | Westinghouse | 92/118 |
| 2,334,835 | 10/1943 | Nix | 92/118 X |
| 2,604,075 | 7/1952 | Naud | 91/210 |
| 2,802,395 | 8/1957 | Madion | 248/291 X |

Primary Examiner—Edgar W. Geoghegan
Assistant Examiner—Allen M. Ostrager
Attorney—Joseph A. Brown, John C. Thompson and James J. Kennedy

[57] ABSTRACT

A hydraulic cylinder mount for the spout control of a forage harvester comprising a support attached to a fixed vertical spout section, adjacent the upper end thereof, a bracket having a pair of axially aligned, spaced-apart retaining rings fixed therein, said bracket being fixed to the support, spherical bearings in the rings, and a second bracket to which a hydraulic cylinder is clamped, the second bracket being connected to the bearings for pivotal movement therewith so that the pivot axis of the cylinder mount passes through the bearings and the center of the cylinder, adjacent the rod end of the cylinder housing, producing an effective force column between the pivot axis and the rotatable spout section of the harvester to which the cylinder rod is connected.

1 Claims, 3 Drawing Figures

INVENTOR
ROBERT A. WAGSTAFF

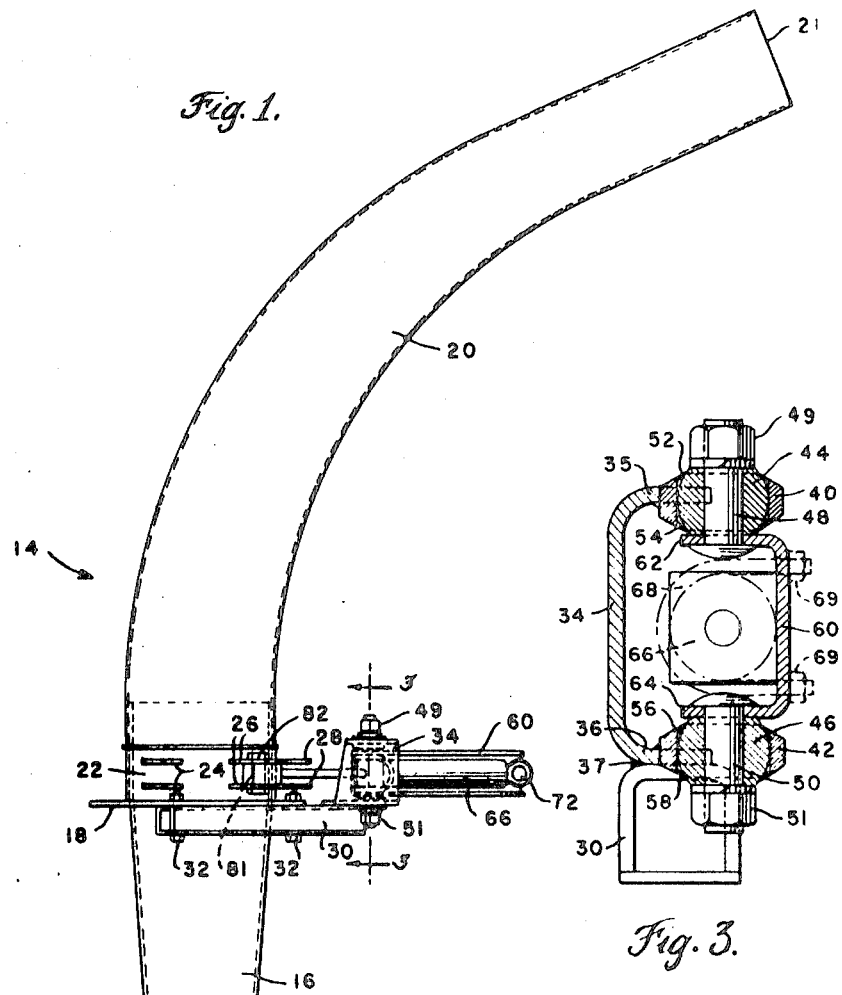

HYDRAULIC CYLINDER MOUNT FOR A FORAGE HARVESTER

This is a division of application Ser. No. 762,930, filed Sept. 26, 1968, now U.S. Pat. No. 3,516,713.

BACKGROUND OF THE INVENTION

A necessary part of any forage harvester is a means to control the direction of the stream of crop material that is discharged therefrom. Such devices are well known in the art, as indicated by U.S. Pat. No. 3,268,268, which shows a hand-operated, worm gear type of spout turning means. The worm gear is operated from the tractor driver's seat by rotating a shaft which extends rearwardly from the tractor to the spout. While such means have functioned in the manner intended, they require a considerable amount of effort on the part of the operator. As the machines become larger, the effort required to turn the spout also increases. Further problems are created because of the conditions under which such a machine is operated. In use, due to weather and crop conditions and from just normal wear, the gearing tends to foul and the turning relation of the spout to its support is effected by binding in the attempt to rotate one element relative to the other.

To overcome these problems and to supply the farmer with a more advanced "pushbutton" type of control means, some farm machinery manufactures have experimented with the use of a hydraulic cylinder to supply the turning moment for the rotatable spout in place of the hand-operated control means, as illustrated in application Ser. No. 695,134 filed Jan. 2, 1968, now U.S. Pat. No. 3,451,725 assigned to the present assignee. In most cases, however, this attempt has been less than satisfactory because with available hydraulic cylinders and known mounting means, the compression loads on the cylinder were enough to cause bending or failure of the cylinder rod. By using specially designed cylinders, having large diameter components, these problems could be overcome, but the costs of such designs were excessive and, therefore, not practical. The most economical way to achieve the desirable characteristics of a hydraulically actuated spout is to be able to use smaller, less expensive elements.

SUMMARY OF THE INVENTION

Accordingly, the present invention relates specifically to mounting arrangement for a hydraulic cylinder for a forage harvester discharge spout which will permit the use of standard actuating cylinders as means to rotate the spout, thus reducing excessive costs.

Another object of the invention is to provide a cylinder mount which locates the cylinder pivot axis as close as practical to the rod end of the cylinder housing.

A further object of the invention is to permit the use of a cylinder having a shorter effective column and a reduced slenderness ratio so as to allow greater compression loads on the cylinder rod without failure.

Still further, an object of the invention is to provide a mounting means having a pivot axis which passes through the center of the cylinder with the pivoting taking place in two spherical bearings and with the bearings providing a self-aligning feature allowing large tolerances on the location of the fixed bearing rings and the shafts.

BRIEF DESCRIPTION OF THE DRAWINGS

FIG. 1 is a side elevation of the forage harvester spout having a hydraulic cylinder mounted in accordance with the present invention.

FIG. 3 is an enlarged section view of the proposed mounting means taken on line 3—3 of FIG. 1.

DESCRIPTION OF THE PREFERRED EMBODIMENT

Figure 2:
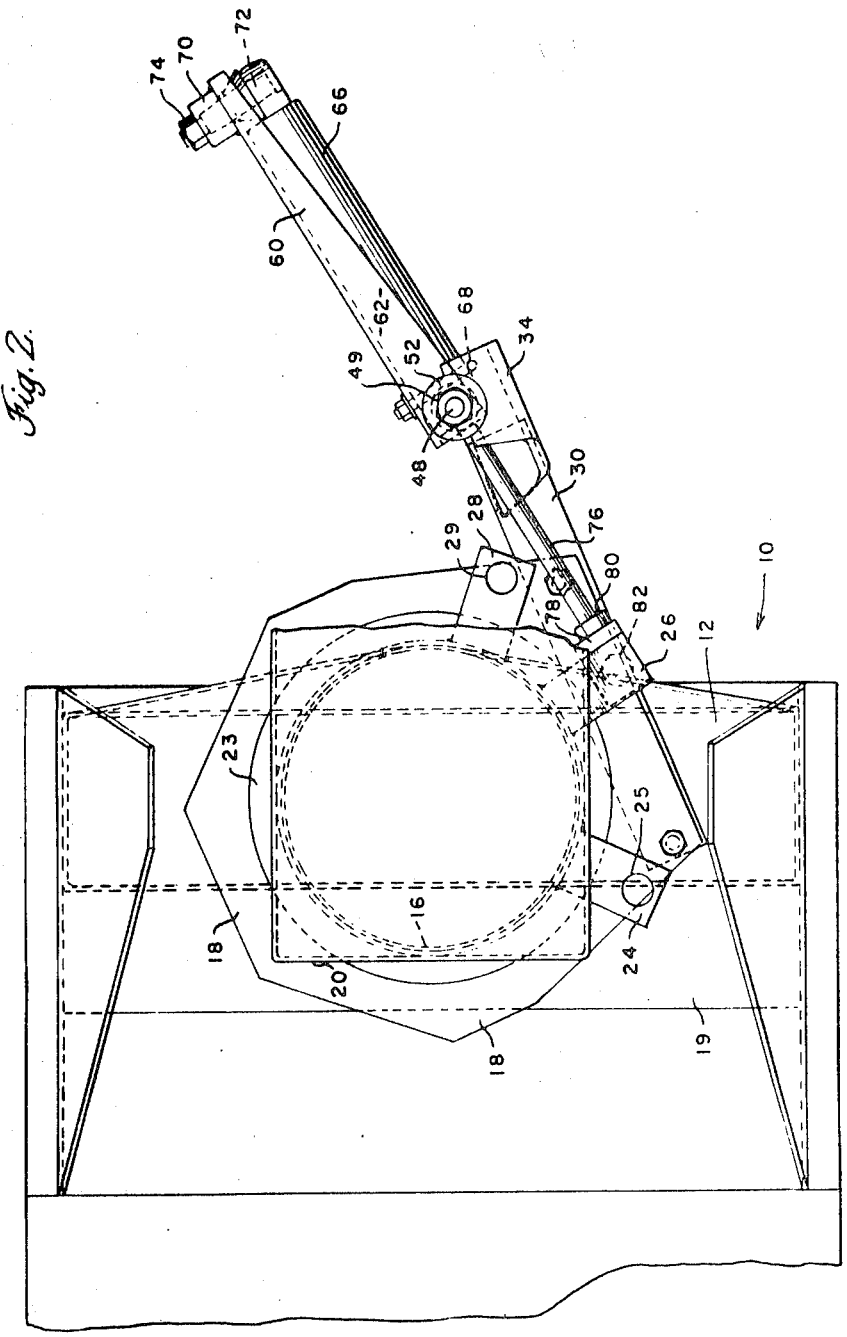
FIG 2 is a plan view showing the cylinder mount and its operable relationship to the forage harvester spout.

Referring generally to FIGS. 1 and 2, a forage harvester 10, of the type generally shown and described in U.S. Pat. Nos. 3,265,444 and 3,313,386 and also assigned to the present assignee, is provided with a cutter housing 12 and a rearwardly disposed spout portion, indicated generally by numeral 14. The lower portion of spout 14 is a substantially vertical support section 16, having a fixed vertical axis, section 16 being fixed to the harvester 10 by frame portion 19. The support section 16 is provided with a fixed vertical axis and has an inlet 17 at the lower end thereof. Adjacent the upper end of section 16 and extending radially outwardly therefrom is a flange 18.

Extending generally upwardly and away from the forage harvester 10 is a rotatable, or pivotal spout section 20, having an outlet 21. Fixed to the lower portion of spout section 20 and concentrically mounted exteriorly of spout portion 16 is a collar 22. The collar 22 has a flanged portion 23 which abuts the flange 18 of spout portion 16 and is rotatable with respect thereto. Mounted exteriorly of the collar 22 and extending transversely outwardly therefrom are a plurality of lug pairs 24, 26 and 28. Each of the lug pairs are fixed to the collar by suitable means (not shown) and are spaced circumferentially therearound. Each lug pair 24, 26 and 28 is provided with bores 25, 27 and 29, respectively, adjacent the outer end thereof. The lugs are adapted to be connected to the hydraulic actuating means, in a manner to be more fully described hereinafter, so that the turning force is applied thereto and is transmitted therefrom to the collar 22 and spout 20 to rotate spout section 20 about the vertical axis of section 16.

Fixed to the under surface of flange 18 is a box support member 30. Support 30 is fixed to the flange by means of mounting bolts 32, or any other suitable means, and extends outwardly therefrom. To the outer end of the support 30 there is fixed a C-shaped bracket 34, by means of a weld, as indicated generally by the numeral 37 shown in FIG. 3. The bracket 34 is provided with a pair of parallel, horizontally extending arms 35 and 36. The end of each outwardly extending arm 35, 36 is adapted to have fixed thereto, by welding or the like as shown in FIG. 3, retaining rings 40 and 42, respectively. Each ring, in turn, is adapted to receive and retain therein spherical bearings 44 and 46. The spherical bearings are provided with an axial bore therein which is adapted to receive pins or bolts 48 and 50, respectively. Each bolt 48 and 50 is provided with a nut 49 and 51, as illustrated in FIG. 3. The bearings are held within the rings 44 and 46 by peening over the edges 52, 54 of ring 44 and edges 56, 58 of ring 46 after the bearings have been inserted. In this manner, the bearings are free to move in the rings, there being only limited surface or surface contact between the bearings and the rings.

Another substantially C-shaped bracket 60, having parallel extending arms 62 and 64, is connected by one end to the spherical bearings by the bolts 48 and 50. With this connection, the bearings 44 and 46, bolts and nuts 48–49 and 50–51, and bracket 60 are pivotal as a unit with respect to bracket 34 and support 30. The spherical bearings provide for a self-aligning feature, permitting large tolerances on the location of the fixed bearing rings 44 and 46 and the bolts which attach bracket 60 to the bearings. The high costs incurred in holding close tolerances and fine machining are eliminated by this arrangement of elements.

The bracket 60 extends generally horizontally away from the bracket 34 and the vertical pivotal axis of the bearings, as shown in FIGS. 1 and 2. A hydraulic cylinder body 66, having a longitudinally extending axis, extends axially within the arms 62 and 64 of the bracket 60 to a point adjacent the outward end of the bracket. The forward end of the cylinder 66 is clamped to the bracket by means of a U-bolt 68 which extends around the cylinder and through the bracket and secured thereto by nuts 69. The rearward end of cylinder 66 is fixed to the bracket by means of a block 70, disposed behind the bracket, and a standard cylinder pin 72 and a nut 74 which clamps the elements together.

A rod or shaft 76, forming an integral part of the hydraulic cylinder 66, extends from the cylinder and is reciprocably driven with respect thereto by means of a piston, (not shown) disposed at the inner end thereof within the cylinder, and operated in response to the application of hydraulic fluid to the cylinder. The cylinder design per se, and its operation, are well known in the art and, therefore, it will not be necessary to render a detailed description of its operation. The forward end of rod 76 terminates in a block 78, best shown in FIG. 2, and a lock nut 80 adjustably secures the rod to the block. The block 78 is provided with a bore 81 through which a shaft or pin 82 is permitted to extend.

The block 78 is positioned so as to be received between one of the lug pairs 24, 26 or 28, according to amount of turning adjustment necessary for the spout 20. The bores 25, 27, or 29, depending on which lug pair is selected, are aligned with bore 81 of the block 78 and the pin 82 is inserted to pivotally connect the cylinder rod 76 to the lugs and collar.

An effective force applying column is formed between the pivotal connection to the lugs and the pivot axis of the cylinder, which passes through the center of the longitudinally extending cylinder at the point where the cylinder is connected to the two spherical bearings, in other words, the pivot axis passes through the rod end of the cylinder transversely to the longitudinal axis thereof. The effective column is substantially shorter than the column formed when the cylinder is pivotally connected by its rearward terminal end, as would be the normal procedure. As the effective column is shortened or lengthened by actuation of the piston in the cylinder, the collar is caused to be turned because of the moment applied thereto through the lugs. The pivotal, or rotational moment of the spout portion 20 is about the fixed vertical axis of spout portion 16.

The shortened effective column achieved using the subject cylinder mount substantially reduces the slenderness ratio of the cylinder. That is, the ratio of the diameter of the cylinder to the length thereof permits greater compression loads on the standard cylinder rod or shaft elements without bending or failure. If the cylinder were mounted so that the cylinder pivot axis were at the rearward end of the cylinder instead of being located as close as practical to the rod end of the cylinder housing, the ratio of the diameter of the cylinder to the length of the cylinder would be considerably higher in order that the assembly resist the bending stresses set up on the rod during a turning operation. Thus by using the cylinder mount hereinbefore described, smaller, less expensive elements may be used to perform the desired ease of operation in causing the spout to turn.

While this invention has been described in connection with a particular embodiment thereof, it will be understood that it is capable of modification, and this application is intended to cover any variations, uses, or adaptations following, in general, the principles of the invention and including any departures from the present disclosure as come within the known or customary practice in the art to which the invention pertains, and as fall within the scope of the invention or the limits of the appended claims.

Having thus described our invention what we claim is:

1. The combination of a hydraulic cylinder having a body portion with a longitudinally extending axis and a rod reciprocable with respect to said body and a mounting means for said cylinder, said mounting means comprising a support, first bracket means fixed to said support and having arms forming a C-shape, spherical bearing means having generally vertically disposed axes mounted in said arms of said bracket means and each having an axial bore with connecting means therein second bracket means connected by said connecting means to said bearing means for supporting the longitudinally extending hydraulic cylinder to be self-aligning and whereby the pivot axis of the mounting means extends transversely through the longitudinal axis of the cylinder adjacent the rod end of the cylinder body portion permitting use of a cylinder with a shorter effective column and a reduced slenderness ration for greater compression loads on the cylinder rod without failure.

* * * * *